United States Patent
Wang

(10) Patent No.: US 10,432,951 B2
(45) Date of Patent: Oct. 1, 2019

(54) CONFORMANCE AND INOPERABILITY IMPROVEMENTS IN MULTI-LAYER VIDEO CODING

(71) Applicant: QUALCOMM Incorporated, San Diego, CA (US)

(72) Inventor: Ye-kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 483 days.

(21) Appl. No.: 14/737,898

(22) Filed: Jun. 12, 2015

(65) Prior Publication Data

US 2015/0373346 A1 Dec. 24, 2015

Related U.S. Application Data

(60) Provisional application No. 62/016,549, filed on Jun. 24, 2014.

(51) Int. Cl.
*H04N 19/152* (2014.01)
*H04N 17/00* (2006.01)
(Continued)

(52) U.S. Cl.
CPC ......... *H04N 19/196* (2014.11); *H04N 19/102* (2014.11); *H04N 19/103* (2014.11);
(Continued)

(58) Field of Classification Search
CPC .. H04N 19/102; H04N 19/103; H04N 19/136; H04N 19/152; H04N 19/184;
(Continued)

(56) References Cited

U.S. PATENT DOCUMENTS

| 2013/0272429 | A1 | 10/2013 | Srinivasan et al. | |
|---|---|---|---|---|
| 2014/0301477 | A1* | 10/2014 | Deshpande | H04N 19/82 375/240.25 |

(Continued)

FOREIGN PATENT DOCUMENTS

| CN | 1778116 A | 5/2006 |
|---|---|---|
| JP | 2005203950 A | 7/2005 |

(Continued)

OTHER PUBLICATIONS

Sullivan G.J., "JCT-VC AHG report: Layered coding constraint specifications and capability indications (AHG10)", 18. JCT-VC Meeting; Jun. 30, 2014-Jul. 9, 2014; Sapporo; (Joint Collaborative Team on Video Coding of ISO/IEC JTC1/SC29/WG11 and ITU-T SG.16); URL: http://wftp3.itu.int/av-arch/jctvc-site/,, No. JCTVC-R0010-v3, Jun. 20, 2014 (Jun. 20, 2014), 38 Pages, XP030116259, cited in the application section [2.4.2 Discussion of JCTVC-R0042 / JCT3V-I0021 [M. M. Hannuksela (Nokia)]].

(Continued)

*Primary Examiner* — James T Boylan
(74) *Attorney, Agent, or Firm* — Procopio, Cory, Hargreaves & Savitch LLP

(57) ABSTRACT

This disclosure provides devices and methods for processing video data. The method can include extracting an output operation point from received video data. If the output operation point corresponds to one of an entire bitstream and a temporal subset of the entire bitstream with only the base layer as output, the method can include performing a first bitstream conformance test. If the output operation point corresponds to one of a layer set specified by a base video parameter set (VPS) of an active VPS and a temporal subset of the layer set with only the base layer to be output, the method can include performing a second bitstream conformance test. If the output operation point corresponds to one of an output layer set (OLS) specified by a VPS extension of the active VPS and a temporal subset of the OLS, the method can include performing a third bitstream conformance test.

26 Claims, 4 Drawing Sheets

(51) Int. Cl.
*H04N 19/196* (2014.01)
*H04N 19/136* (2014.01)
*H04N 19/184* (2014.01)
*H04N 19/103* (2014.01)
*H04N 19/169* (2014.01)
*H04N 19/187* (2014.01)
*H04N 19/70* (2014.01)
*H04N 19/30* (2014.01)
*H04N 19/102* (2014.01)

(52) U.S. Cl.
CPC ......... *H04N 19/136* (2014.11); *H04N 19/152* (2014.11); *H04N 19/184* (2014.11); *H04N 19/187* (2014.11); *H04N 19/188* (2014.11); *H04N 19/30* (2014.11); *H04N 19/70* (2014.11)

(58) Field of Classification Search
CPC .. H04N 19/187; H04N 19/188; H04N 19/196; H04N 19/30; H04N 19/70
USPC ......................................... 375/240.02, 240.25
See application file for complete search history.

(56) References Cited

U.S. PATENT DOCUMENTS

| | | | | |
|---|---|---|---|---|
| 2015/0103886 A1* | 4/2015 | He | ........................ | H04N 19/188 375/240.02 |
| 2015/0103921 A1* | 4/2015 | Hannuksela | ......... | H04N 19/152 375/240.26 |
| 2015/0264404 A1* | 9/2015 | Hannuksela | ........... | H04N 19/70 375/240.16 |
| 2017/0150160 A1* | 5/2017 | Deshpande | ............ | H04N 19/44 |

FOREIGN PATENT DOCUMENTS

| | | |
|---|---|---|
| WO | 2014047577 A1 | 3/2014 |
| WO | 2014058600 A1 | 4/2014 |

OTHER PUBLICATIONS

Wang Y K., et al., "MV-HEVC/SHVC HLS: Miscellaneous cleanups", 18. JCT-VC Meeting; Jun. 30, 2014-Jul. 9, 2014; Sapporo; (Joint Collaborative Team on Video Coding of ISO/IEC JTC1/SC29/WG11 and ITU-T SG.16 ); URL: http://wftp3.itu.int/av-arch/jctvc-site/. No. JCTVC-R0227-v2. Jul. 10, 2014 (Jul. 10, 2014), XP030116528, the whole document.

Deshpande S. et al., "An Improved Hypothetical Reference Decoder for HEVC," Proc. SPIE 8666, Visual Information Processing and Communication IV, Feb. 21, 2013, pp. 866608-1 to 866608-9, vol. 8666.

International Search Report and Written Opinion—PCT/US2015/035853—ISA/EPO—dated Sep. 11, 2015.

Wang Y-K et al., "HEVCv1/MV-HEVC/SHVC HLS: Conformance cleanups", 18. JCT-VC Meeting; Jun. 30, 2014-Jul. 9, 2014; Sapporo; (Joint Collaborative Team on Video Coding of ISO/IEC JTC1/SC29/WG11 and ITU-T SG.16 ); URL:http://wftp3.itu.int/av-arch/jctvc-site/ No. JCTVC-R0272, Jun. 24, 2014 (Jun. 24, 2014), XP030116581.

* cited by examiner

CONFORMANCE AND INOPERABILITY IMPROVEMENTS IN MULTI-LAYER VIDEO CODING

CROSS REFERENCE TO RELATED APPLICATIONS

This application claims priority to U.S. Provisional Application 62/016,549, filed Jun. 24, 2014, entitled "CONFORMANCE AND INOPERABILITY IMPROVEMENTS IN MULTI-LAYER VIDEO CODING," the contents of which are hereby incorporated by reference in their entirety.

BACKGROUND

Technological Field

This disclosure relates to multi-layer video coding. More particularly, this disclosure relates to methods for conformance and interoperability in multi-layer video coding, including signaling of profile, tier, and level information, signaling of output layer sets, the use of hypothetical reference decoder (HRD) parameters, and bitstream conformance tests.

Related Art

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement one or more video coding techniques. The video devices may transmit, receive, encode, decode, and/or store digital video information more efficiently by implementing such video coding techniques.

Video coding techniques include, without limitation, those described in the standards defined by ITU-T H.261, ISO/IEC MPEG-1 Visual, ITU-T H.262 or ISO/IEC MPEG-2 Visual, ITU-T H.263, ISO/IEC MPEG-4 Visual, and ITU-T H.264 or ISO/IEC MPEG-4 Advanced Video Coding (AVC) (including its Scalable Video Coding (SVC) and Multiview Video Coding (MVC) extensions), and the relatively new High Efficiency Video Coding (HEVC) standard. The HEVC standard was recently finalized by the Joint Collaboration Team on Video Coding (JCT-VC) of the Video Coding Experts Group (VCEG) of the International Telecommunication Union's Telecommunication Standardization Sector (ITU-T) and the Moving Picture Experts Group (MPEG), formed by the International Organization for Standardization (ISO) and the International Electrotechnical Commission (IEC). The latest working draft (WD) of the HEVC specification, referred to as HEVC WD10, is available from phenix.int-evry.fr/jct/doc_end_user/documents/12_Geneva/wg11/JCTVC-L1003-v34.zip. The multiview extension to HEVC, namely MV-HEVC, is also being developed by the JCT-3V. A recent working draft of MV-HEVC WD3 hereinafter, is available from phenix.it-sudparis.eu/jct2/doc_end_user/documents/3_Geneva/wg11/JCT3V-C1004-v4.zip. The scalable extension to HEVC, named SHVC, is also being developed by the JCT-VC. A recent working draft of SHVC and referred to as SHVC WD2 hereinafter is available from phenix.int-evry.fr/jct/doc_end_user/documents/13_Incheon/wg11/JCTVC-M1008-v1.zip.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs), and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

A multi-view coding bitstream may be generated by encoding views, e.g., from multiple perspectives. Some three-dimensional (3D) video standards have been developed that make use of multiview coding aspects. For example, different views may transmit left and right eye views to support 3D video. Alternatively, some 3D video coding processes may apply so-called multiview plus depth coding. In multiview plus depth coding, 3D video bitstream may contain not only texture view components, but also depth view components. For example, each view may comprise one texture view component and one depth view component.

SUMMARY

In general, this disclosure describes systems and methods related to conformance and interoperability improvements in multi-layer video coding. The systems, methods, and devices of this disclosure each have several innovative aspects, no single one of which is solely responsible for the desirable attributes disclosed herein.

One aspect of the disclosure provides a method of processing video data. The method can include receiving coded video data having a plurality of output operation points. The method can also include extracting a selected output operation point from the plurality of output operation points. In response to the selected output operation point corresponding to one of an entire bitstream and a temporal subset of the entire bitstream with only the base layer to be output, the method can also include performing a first bitstream conformance test on the selected output operation point, the first bitstream conformance test being based on a set of sequence-level hypothetical reference decoder (HRD) parameters in an active sequence parameter set (SPS) for a base layer, and one or more non-nested supplemental enhancement information (SEI) messages. In response to the selected output operation point corresponding to one of a layer set specified by a base video parameter set (VPS) of an active VPS and a temporal subset of the layer set with only the base layer to be output, the method can also include performing a second bitstream conformance test on the selected output operation point, the second bitstream conformance test being based on a set of sequence-level HRD parameters in the base VPS and directly nested SEI messages. In response to the selected output operation point corresponding to one of an output layer set (OLS) specified by a VPS extension of the active VPS and a temporal subset of the OLS, the method can also include performing a third bitstream conformance test on the selected output operation point, the third bitstream conformance test being based on a set of sequence-level HRD parameters in the active VPS and indirectly nested SEI messages.

Another aspect of the disclosure provides a device for processing video data. The device can have a memory configured to store coded video data, the coded video data having a plurality of output operation points. The device can also have a processor operably coupled to the memory and configured to extract a selected output operation point from the plurality of output operation points. In response to the selected output operation point corresponding to one of an entire bitstream and a temporal subset of the entire bitstream with only the base layer to be output, the processor can be further configured to perform a first bitstream conformance test on the selected output operation point, the first bitstream conformance test being based on a set of sequence-level hypothetical reference decoder (HRD) parameters in an active sequence parameter set (SPS) for a base layer, and one or more non-nested supplemental enhancement information (SEI) messages. In response to the selected output operation point corresponding to one of a layer set specified by a base video parameter set (VPS) of an active VPS and a temporal subset of the layer set with only the base layer to be output, the processor can be further configured to perform a second bitstream conformance test on the selected output operation point, the second bitstream conformance test being based on a set of sequence-level HRD parameters in the base VPS and directly nested SEI messages. In response to the selected output operation point corresponding to one of an output layer set (OLS) specified by a VPS extension of the active VPS and a temporal subset of the OLS, the processor can be further configured to perform a third bitstream conformance test on the selected output operation point, the third bitstream conformance test being based on a set of sequence-level HRD parameters in the active VPS and indirectly nested SEI messages.

Another aspect of the disclosure provides an apparatus for processing video data. The apparatus can have a memory means for storing coded video data, the video data having a plurality of output operation points. The apparatus can also have a decoder means operably coupled to the memory means for extracting a selected output operation point from the plurality of output operation points. In response to the selected output operation point corresponding to one of an entire bitstream and a temporal subset of the entire bitstream with only the base layer to be output, the decoder means can also perform a first bitstream conformance test on the selected output operation point, the first bitstream conformance test being based on a set of sequence-level hypothetical reference decoder (HRD) parameters in an active sequence parameter set (SPS) for a base layer, and one or more non-nested supplemental enhancement information (SEI) messages. In response to the selected output operation point corresponding to one of a layer set specified by a base video parameter set (VPS) of an active VPS and a temporal subset of the layer set with only the base layer to be output, the decoder means can also perform a second bitstream conformance test on the selected output operation point, the second bitstream conformance test being based on a set of sequence-level HRD parameters in the base VPS and directly nested SEI messages. In response to the selected output operation point corresponding to one of an output layer set (OLS) specified by a VPS extension of the active VPS and a temporal subset of the OLS, the decoder means can also perform a third bitstream conformance test on the selected output operation point, the third bitstream conformance test being based on a set of sequence-level HRD parameters in the active VPS and indirectly nested SEI messages.

Another aspect of the disclosure provides a non-transitory computer-readable medium for processing video data. The non-transitory computer-readable medium can contain instructions that when executed by a processor cause a computer to receive coded video data having a plurality of output operation points. The instructions can also cause the computer to extract a selected output operation point from the plurality of output operation points. In response to the selected output operation point corresponding to one of an entire bitstream and a temporal subset of the entire bitstream with only the base layer to be output, the instructions can also cause the computer to perform a first bitstream conformance test on the selected output operation point, the first bitstream conformance test being based on a set of sequence-level hypothetical reference decoder (HRD) parameters in an active sequence parameter set (SPS) for a base layer, and one or more non-nested supplemental enhancement information (SEI) messages. In response to the selected output operation point corresponding to one of a layer set specified by a base video parameter set (VPS) of an active VPS and a temporal subset of the layer set with only the base layer to be output, the instructions can also cause the computer to perform a second bitstream conformance test on the selected output operation point, the second bitstream conformance test being based on a set of sequence-level HRD parameters in the base VPS and directly nested SEI messages. In response to the selected output operation point corresponding to one of an output layer set (OLS) specified by a VPS extension of the active VPS and a temporal subset of the OLS, the instructions can also cause the computer to perform a third bitstream conformance test on the selected output operation point, the third bitstream conformance test being based on a set of sequence-level HRD parameters in the active VPS and indirectly nested SEI messages.

Other features and advantages of the present disclosure should be apparent from the following description which illustrates, by way of example, aspects of the disclosure.

BRIEF DESCRIPTION OF THE FIGURES

The details of embodiments of the present disclosure, both as to their structure and operation, may be gleaned in part by study of the accompanying drawings, in which like reference numerals refer to like parts, and in which.

DETAILED DESCRIPTION

Figure 1:
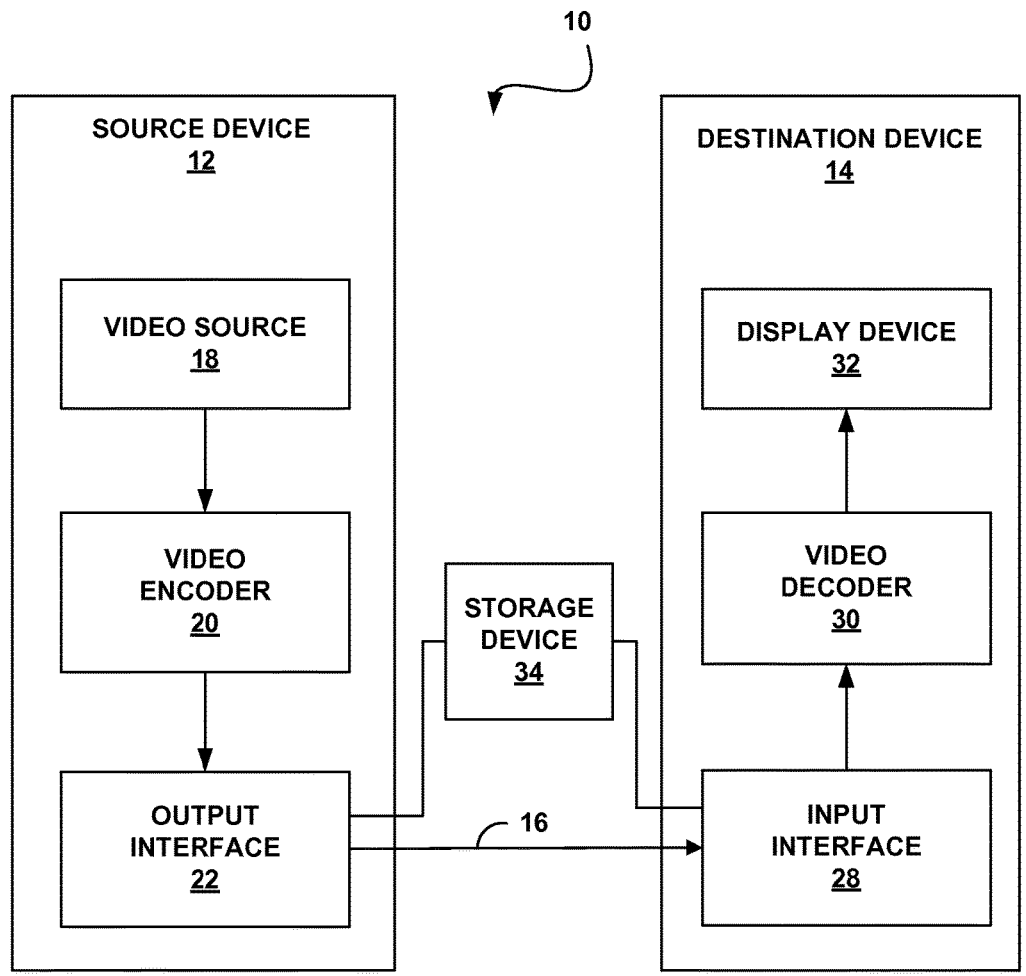
FIG. 1 is a functional block diagram of a video coding system.

In general, this disclosure describes systems and methods related to bitstream conformance and interoperability improvements in multi-layer video coding. Some of the methods including signaling of profile, tier, and level information, signaling of output layer sets, use of HRD parameters, and bitstream conformance tests.

This disclosure identifies certain shortcomings of the current HEVC specification, regarding signaling of profile, tier, and level information, signaling of output layer sets, use of HRD parameters, and bitstream conformance tests. Some of these shortcomings include the following:

Except for the $0^{th}$ output layer set (OLS), optimal tier and level for other base-layer-output-only OLSs can be signaled in the extension part of the video parameter set (VPS). A base-layer-output-only OLS is an OLS for which there is only one output layer and the only output layer is the base layer. Such signaling is not needed because HEVC does not require that a base-layer-output-only OLS be signaled in the VPS extension for each layer set signaled in the base VPS. The profile, tier, and level information for the entire bitstream is instead signaled in the VPS base. Therefore from an HEVC version 1 point of view, it is not ideal to conduct bitstream conformance tests for all the operation points with their own HRD parameters, while only checking the constraints against only the tier and level of the entire bitstream. This can allow the HRD parameters for all operation points other than the one corresponding to the entire bitstream to be much "higher" than optimal while still satisfying the conformance tests.

HEVC allows signaling of base-layer-output-only OLSs in the VPS extension. However, the base VPS already satisfies such a role. Accordingly, such signaling in the VPS extension is unnecessary, resulting in increased overhead.

The HEVC standard is unclear as to the applicability of non-nested and directly nested buffering period (BP), picture timing (PT), and decoding unit information (DUI) supplemental enhancement information (SEI) messages with respect to which of such SEI messages should be selected for use in some bitstream conformance tests.

The use of the profile, tier, level (PTL) syntax structure is not clearly specified during bitstream conformance tests. For example, some bitstream conformance tests for base-layer-output-only OLSs are missing. The use of the hrd_parameters( ) syntax structure and the BP, PT, and DUI SEI messages is not clear for some conformance tests.

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent to those skilled in the art that the disclosure without these specific details. In some instances, well-known structures and components are shown in simplified form for brevity of description.

Video Coding System

FIG. 1 is a functional block diagram of a video coding system. A video coding system ("system") 10 that may utilize methods in accordance with aspects described in this disclosure. As used described herein, the term "video coder" refers generically to both video encoders and video decoders. In this disclosure, the terms "video coding" or "coding" may refer generically to video encoding and video decoding.

As shown in FIG. 1, the system 10 includes a source device 12 that can generate encoded video data to be decoded at a later time by a destination device 14. The source device 12 and the destination device 14 can comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

The destination device 14 may receive the encoded video data to be decoded via a link 16. The link 16 may comprise any type of medium or device capable of moving the encoded video data from the source device 12 to the destination device 14. In one example, the link 16 may comprise a communication medium to enable source device 12 to transmit encoded video data directly to the destination device 14 in real-time. The source device 12 may modulate the encoded video data according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

Encoded data may be output from the output interface 22 to a storage device 34. Similarly, encoded data may be accessed from the storage device 34 by the input interface 28 of the destination device 14. The storage device 34 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device 34 may correspond to a file server or another intermediate storage device that may hold the encoded video generated by the source device 12. The destination device 14 may access stored video data from the storage device 34 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device 34 may be a streaming transmission, a download transmission, or a combination of both.

The methods of this disclosure are not necessarily limited to wireless applications or settings. The methods may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, the source device 12 includes a video source 18, video encoder 20, and an output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, the source device 12 and destination the device 14 may form so-called camera phones or video phones. However, the methods described in this disclosure may be applicable to video coding in general, and may be applied to wireless and/or wired applications.

The video encoder 20 may encode the captured, pre-captured, or computer-generated video. Additionally, in some embodiments, the video decoder 30 may differentiate between a first bitstream and a second bitstream based on the parameter set ID of the first bitstream and the unique parameter set ID. In other examples, output interface 22 of the source device 12 may transmit the encoded video data directly to the destination device 14 via the link 16. The encoded video data may also (or alternatively) be stored onto the storage device 34 for later access by the destination device 14 or other devices, for decoding and/or playback.

The destination device 14 includes an input interface 28, a video decoder 30, and a display device 32. In some cases, the input interface 28 may include a receiver and/or a modem. The input interface 28 of the destination device 14 receives the encoded video data over the link 16. The encoded video data communicated over the link 16, or provided on the storage device 34, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the methods are implemented partially in software, a device may store instructions for the software in a suitable, non-transitory computer-readable medium and execute the instructions in hardware using one or more processors to perform the methods of this disclosure. Each of the video encoder 20 and the video decoder 30 may be included in one or more encoders or decoders, either of which may be integrated as part of a combined encoder/decoder (CODEC) in a respective device.

The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs can be sized based on the size of PUs within a given CU defined for a partitioned LCU, although this may not always be the case. The TUs can be the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, the video encoder 20 may calculate residual values corresponding to the PU. The residual values comprise pixel difference values that may be transformed into transform coefficients, quantized, and scanned using the TUs to produce serialized transform coefficients for entropy coding. As used herein, the term "video block" may generally refer to a coding node of a CU. In some specific cases, this disclosure may also use the term "video block" to refer to a treeblock, i.e., LCU, or a CU, which includes a coding node and PUs and TUs.

The video encoder 20 can generate a bitstream that includes encoded video data. The bitstream can include a series of network abstraction layer (NAL) units. The NAL units of the bitstream may include video coding layer (VCL) NAL units and non-VCL NAL units. The VCL NAL units can include coded slices of pictures. A non-VCL NAL unit may include a VPS, a sequence parameter set (SPS), a picture parameter set (PPS), SEI, or other types of data. A VPS is a syntax structure that may contain syntax elements that apply to zero or more entire coded video sequences. A SPS is a syntax structure that may contain syntax elements that apply to zero or more entire coded video sequences. A single VPS may be applicable to multiple SPSs. A PPS is a syntax structure that may contain syntax elements that apply to zero or more entire coded pictures. A single SPS may be applicable to multiple PPS's. Various aspects of the VPS, SPS, and PPS may be formed, in general, as defined by the HEVC standard. The video encoder 20 may use SEI messages to include, in the bitstream, metadata that is not required for correct decoding of the sample values of pictures. However, video decoder 30 or other devices may use the metadata included in SEI messages for various other purposes. For example, the video decoder 30 may use the metadata in SEI messages for picture output timing, picture displaying, loss detection, and error concealment.

High Level Syntax

The NAL units can contain syntax elements encoded by the video encoder 20 and transmitted to the video decoder 30. The syntax elements that describe the structure of the bitstream or provide information that applies to multiple pictures or to multiple coded block regions within a picture, such as the parameter sets (e.g., SPS, VPS, PPS, etc.), reference picture management syntax, and SEI messages, are known as "high-level syntax" (HLS) part of HEVC.

In particular, HEVC employs the following aspects, relevant to this disclosure:

Parameter Set Structure:

Parameter sets contain information that can be shared for the decoding of several regions of the decoded video. The parameter set structure provides a robust mechanism for conveying data that are essential to the decoding process.

Supplemental Enhancement Information (SEI):

The syntax includes support for various types of metadata known as SEI. Such data provide information about the timing of the video pictures, the proper interpretation of the color space used in the video signal, 3-D stereoscopic frame packing information, other display hint information, and so on.

Figure 2:
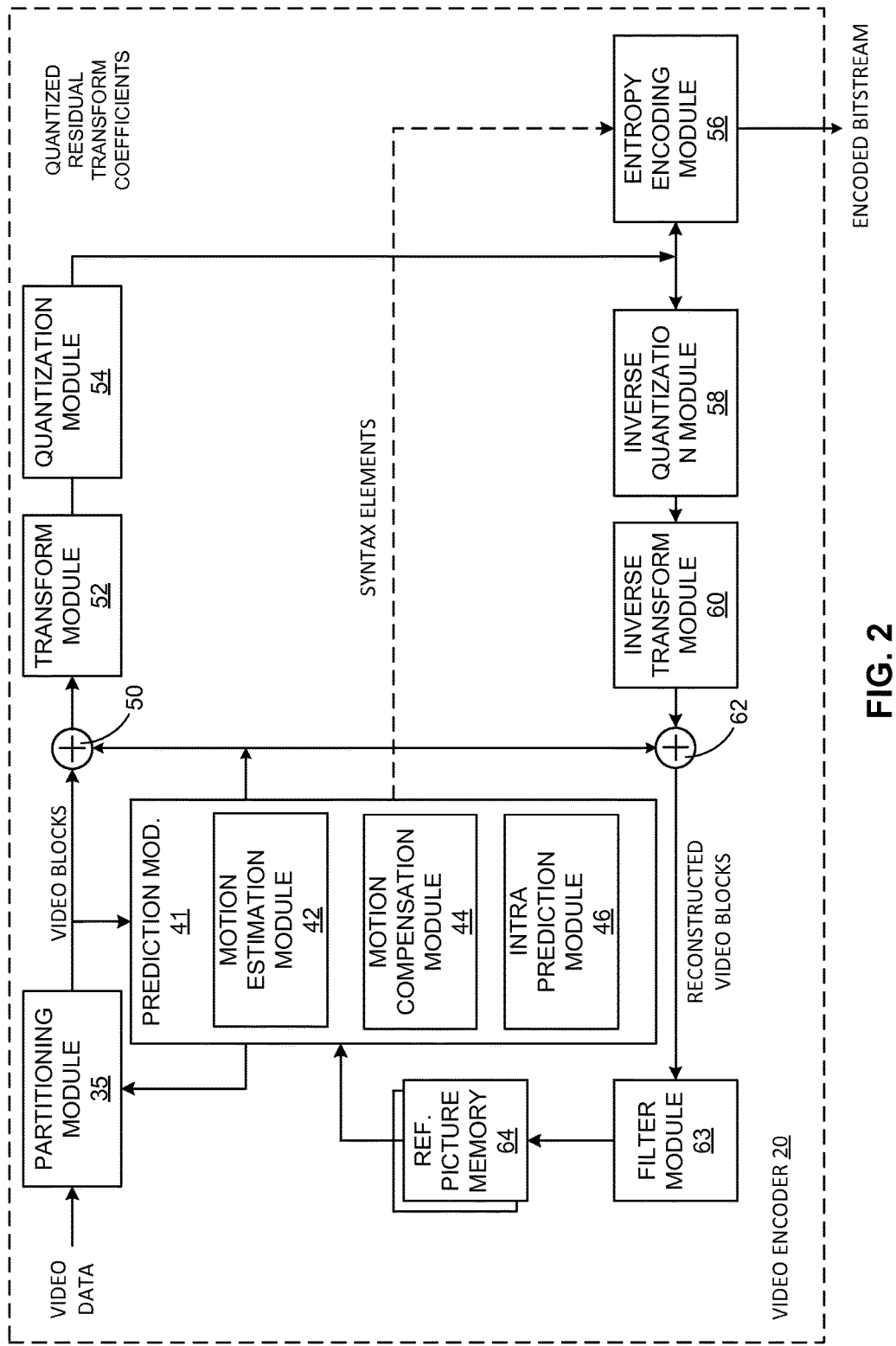
FIG. 2 is a functional block diagram of the video encoder of FIG. 1.

FIG. 2 is a functional block diagram of the video encoder of FIG. 1. The video encoder 20 can include a partitioning module 35 configured to receive captured video data and partition the video data into video blocks. The partitioning module 35 can partition the video data into slices, tiles, or other larger units. The partitioning module 35 can also partition video blocks, e.g., according to a quadtree structure of LCUs and CUs. The video encoder 20 may divide the slice into multiple video blocks (and possibly into sets of video blocks referred to as tiles).

The video encoder 20 can also have a prediction module 41 operably coupled to the partitioning module 35 and configured to receive the partitioned video data. The prediction module 41 can select one of a plurality of possible coding modes, such as one of a plurality of intra coding modes or one of a plurality of inter coding modes, for the current video block based on error results (e.g., coding rate and the level of distortion). The prediction module 41 can allow the video encoder 20 to perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

The prediction module 41 can include a motion estimation module 42, a motion compensation module 44, and an intra-prediction module 46. Each of these components can be operably connected or integrated in one or more processors within the video encoder 20. While discussed separately for conceptual purposes, the motion estimation module 42, the motion compensation module 44, and the intra-prediction module 46 can be highly integrated.

The motion estimation module 42 can be configured to determine the inter-prediction mode for a video slice according to a predetermined pattern for a video sequence. Such inter-prediction or inter-predictive coding of the current video block relative to one or more predictive blocks in one or more reference pictures can provide temporal compression. The predetermined pattern may designate video slices in the sequence as P slices, B slices or GPB slices. Motion estimation, as used herein, may generally refer to the process of generating motion vectors, which estimate motion for video blocks. A motion vector, for example, may indicate the displacement of a PU of a video block within a current video frame or picture relative to a predictive block within a reference frame or reference picture. The reference frames can be stored in a reference picture memory 64 operably coupled to the prediction module 41. The reference frame memory 64 can further include or be referred to herein as a decoded picture buffer (DPB). The reference frame memory 64, or DPB, can store reconstructed coding blocks after a filter module 63 performs deblocking operations on the reconstructed coding blocks.

A predictive block is a block that is found to closely match the PU of the video block to be coded in terms of pixel difference, which may be determined by sum of absolute difference (SAD), sum of square difference (SSD), or other difference metrics. In some examples, the motion prediction module ("prediction module") 41 can calculate values for sub-integer pixel positions of reference pictures stored in the reference picture memory 64. For example, the prediction module 41 can interpolate values of one-quarter pixel positions, one-eighth pixel positions, or other fractional pixel positions of the reference picture. Therefore, the motion estimation module 42 may perform a motion search relative to the full pixel positions and fractional pixel positions and output a motion vector with fractional pixel precision.

The motion estimation module 42 can calculate a motion vector for a PU of a video block in an inter-coded slice by comparing the position of the PU to the position of a predictive block of a reference picture. The reference picture can be selected from a first reference picture list (List 0) or a second reference picture list (List 1), each of which identify one or more reference pictures stored in the reference picture memory 64. The motion estimation module 42 can send the calculated motion vector to the motion compensation module 44 and an entropy encoding module 56.

Motion compensation can involve fetching or generating the predictive block based on the motion vector determined by motion estimation. This can include interpolations to sub-pixel precision. Upon receiving the motion vector for the PU of the current video block, the motion compensation module 44 can locate the predictive block to which the motion vector points in one of the reference picture lists. The motion compensation module 44 can also generate syntax elements associated with the video blocks and the video slice for use by the video decoder 30 in decoding the video blocks of the video slice.

The intra-prediction module 46 within the prediction module 41 can perform intra-predictive coding of the current video block relative to one or more neighboring blocks in the same frame or slice to provide spatial compression. The intra-prediction module 46 can intra-predict a current block, as an alternative to the inter-prediction performed by the motion estimation module 42 and the motion compensation module 44, as described above. In particular, intra-prediction module 46 may determine an intra-prediction mode to use to encode a current block. In some examples, the intra-prediction module 46 may encode a current block using various intra-prediction modes, e.g., during separate encoding passes. For example, the intra-prediction module 46 may calculate rate-distortion values using a rate-distortion analysis for the various tested intra-prediction modes, and select the intra-prediction mode having the best rate-distortion characteristics among the tested modes. Rate-distortion analysis can determine an amount of distortion (or error) between an encoded block and an original, unencoded block that was encoded to produce the encoded block, as well as a bit rate (that is, a number of bits) used to produce the encoded block. The intra-prediction module 46 may calculate ratios from the distortions and rates for the various encoded blocks to determine which intra-prediction mode exhibits the best rate-distortion value for the block.

The intra-prediction module 46 can provide information indicative of the selected intra-prediction mode for the block to the entropy encoding module 56. The entropy encoding module 56 can encode the information indicating the selected intra-prediction mode. The video encoder 20 can include configuration data in the transmitted bitstream, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After the prediction module 41 generates the predictive block for the current video block via either inter-prediction or intra-prediction, the video encoder 20 forms a residual video block by subtracting the predictive block from the current video block. This process can result in pixel difference values. The pixel difference values form the residual data for the block, and can include both luma and chroma difference components. A summer 50, operably coupled to the prediction module 41 and the partitioning module 35, represents the component or components that can be configured to perform this subtraction operation.

The residual video data in the residual block may be included in one or more TUs and applied to a transform module 52 operably coupled to the summer 50. The transform module 52 can transform the residual video data into residual transform coefficients using a transform, such as a discrete cosine transform (DCT) or a conceptually similar transform. The transform module 52 can convert the residual video data from a pixel domain to a transform domain, such as a frequency domain. The prediction module 41 can provide the resulting intra- or inter-coded block to the summer 50 to generate residual block data. The resulting intra- or inter-coded block can further be provided a summer 62 to reconstruct the encoded block for use as a reference picture.

The video encoder 20 can also include the filter module 63 operably coupled to the summer 62. The filter module 63 can represent one or more loop filters such as a deblocking filter, an adaptive loop filter (ALF), and a sample adaptive offset (SAO) filter. Although filter module 63 is shown in FIG. 2 as being an in loop filter, in other configurations, the filter module 63 can be implemented as a post loop filter. The filter module 63 can provide reference pictures to the reference picture memory 64.

The transform module 52 can send the resulting transform coefficients to a quantization module 54. The quantization module 54 can quantize the transform coefficients to further reduce bit rate. The quantization process may reduce the bit depth associated with some or all of the coefficients. The degree of quantization may be modified by adjusting a quantization parameter. In some examples, the quantization module 54 can then perform a scan of the matrix including the quantized transform coefficients. In some embodiments, the entropy encoding module 56 may perform the scan.

Following quantization, the entropy encoding module 56 can entropy encode the quantized transform coefficients. For example, the entropy encoding module 56 may perform context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. The video encoder 20 may also entropy encode syntax elements associated with the encoded video data for use by the video decoder 30 in decoding the video data.

Following the entropy encoding by the entropy encoding module 56, the encoded bitstream can be transmitted to the video decoder 30. The bitstream can also be archived for later transmission or retrieval by the video decoder 30. The entropy encoding module 56 can also entropy encode the motion vectors and the other syntax elements for the current video slice being coded.

The video encoder 20 can also include an inverse quantization module 58 operably coupled to the entropy encoding module 56. An inverse transform module 60 can also be operably coupled to the inverse quantization module 58 and the summer 62. The inverse quantization module 58 and the inverse transform module 60 can apply inverse quantization and inverse transformation, respectively, to reconstruct the residual block in the pixel domain for later use as a reference block of the reference picture. The motion compensation module 44 can calculate a reference block by adding the residual block to a predictive block of one of the reference pictures within one of the reference picture lists. The summer 62 can add the reconstructed residual block to the motion compensated prediction block produced by the motion compensation module 44 to produce a reference block for storage in the reference picture memory 64. The reference block can be used by the motion estimation module 42 and the motion compensation module 44 as a reference block to inter-predict a block in a subsequent video frame or picture.

In some examples, video encoder 20 generates a bitstream. The bitstream generated by the video encoder 20 may include multiple operation points that can be extracted as sub-bitstreams from the bitstream. The operation points may include, for example, multiple layers and/or views, as well as multiple frame rates. The video encoder 20 may encode information indicative of the output operation points in the VPS. In some examples, for each of the operation points that the video encoder 20 signals in the VPS associated with the bitstream, an operation point syntax structure specifies a set of layer identifiers (IDs) used to identify NAL units in the bitstream that belong to a sub-bitstream of a given operation point. In this way, NAL units that make up the sub-bitstream of the given operation point may be extracted from the original bitstream based on the layer identifiers of the NAL units.

In some cases the video encoder 20 may further encode HRD parameters that are related to one or more of the operation points, as discussed in greater detail below. In this case, video encoder 20 signals HRD parameter information in the VPS. The video encoder 20 may contain an implementation of an HRD to ensure that each bitstream generated is a conforming bitstream. The HRD implementation may also be part of other entities such as decoders (e.g., the video decoder 30) and bitstream analyzers to check whether a bitstream is a conforming bitstream. As discussed in greater detail below, for each of the one or more operation points that have HRD parameters, an HRD parameter syntax structure may specify a set of HRD parameters that defines an HRD used to check conformance of a sub-bitstream of a given operation point.

As used herein, an operation point is a bitstream created from another bitstream by operation of the sub-bitstream extraction process with another bitstream, a target highest temporal_ID, and a target layer identifier list as inputs. More specifically, "operation points" are sub-bitstreams that can be extracted from an original bitstream that are scalable temporally and/or with multiple layers and/or views. That is, an operation point is a bitstream that is created from another bitstream by operation of the sub-bitstream extraction process with the other bitstream, a target highest temporal ID, and a target layer identifier list as inputs. The bitstream includes one or more views, including the view(s) of the operation point. The target highest temporal_ID defines the temporal subset. The target layer list includes a set of layers: the set of layers to be decoded for an operation point, and the set of layers to be output for an output operation point. An output operation point is associated with, inter alia, a set of output layers, i.e., the layers identified in the output layer set, which are the layers that are to be output. In general, each bitstream can contain one or more output layer sets. Each output layer set can contain one or more output operation points. A bitstream conformance test is performed for each output operation point to ensure that the corresponding sub-bitstream is a conforming bitstream.

The term "layer set" is used to refer to a set of layers to be decoded. A "layer set" is similar to an operation point except that a layer set is not associated with a particular value of temporal ID. Rather, the temporal sub-layers present in the layers all pertain to the layer set. Similarly, a layer set can be said to be associated with the highest possible Temporal ID. Accordingly, the temporal sub-layers present in the layers all belong to the layer set. A layer set can be derived from a bitstream in the same way that an operation point can be derived from a bitstream, with the highest temporal ID being the highest possible value.

The term "output layer set" refers to a layer set for which the output layers are specified. Thus, while the set of layers to be decoded is specified as a layer set, the set of layers to be output is specified for an output layer set. In some examples, the output layer set identifies the corresponding layer set by including an index to the corresponding layer set, where the corresponding layer set identifies the layers to be decoded. In other examples, the output layer set identifies the corresponding layer set in some other manner.

Layers in the layer set not targeted for output may still be decoded, e.g., when used for inter-layer (or inter-view) prediction. The layers that are targeted for output are a subset of the layers that are to be decoded: one, some, or all of the layers to be decoded may be targeted for output. It should be understood that the term "subset" does not necessarily mean that the layer to be output is a strict subset of the layers to be decoded. That is, in some examples, layers to be decoded and the layer to be output are the same. Thus the distinction between an output layer set and an output operation point is similar to the distinction between a layer set and an operation point as described above.

The sub-bitstreams may be extracted from the bitstream based on values of layer identifiers (identifying the layers for the output operation point) and temporal sub-layer identifiers (identifying the temporal subset for the output operation point) that identify the output operation point of the bitstream. The output operation points can be signaled in a VPS within the bitstream. For each of the operation points, an operation point syntax structure specifies a set of layer identifiers used to identify network abstraction layer (NAL) units in the bitstream that belong to a sub-bitstream of a given operation point. In this way, NAL units that make up the sub-bitstream of the given output operation point may be extracted from the original bitstream based on the layer identifiers of the NAL units and the highest temporal ID associated with the output operation point. NAL units are the components of the coded video data; the coded video data is organized into NAL units.

Figure 3:
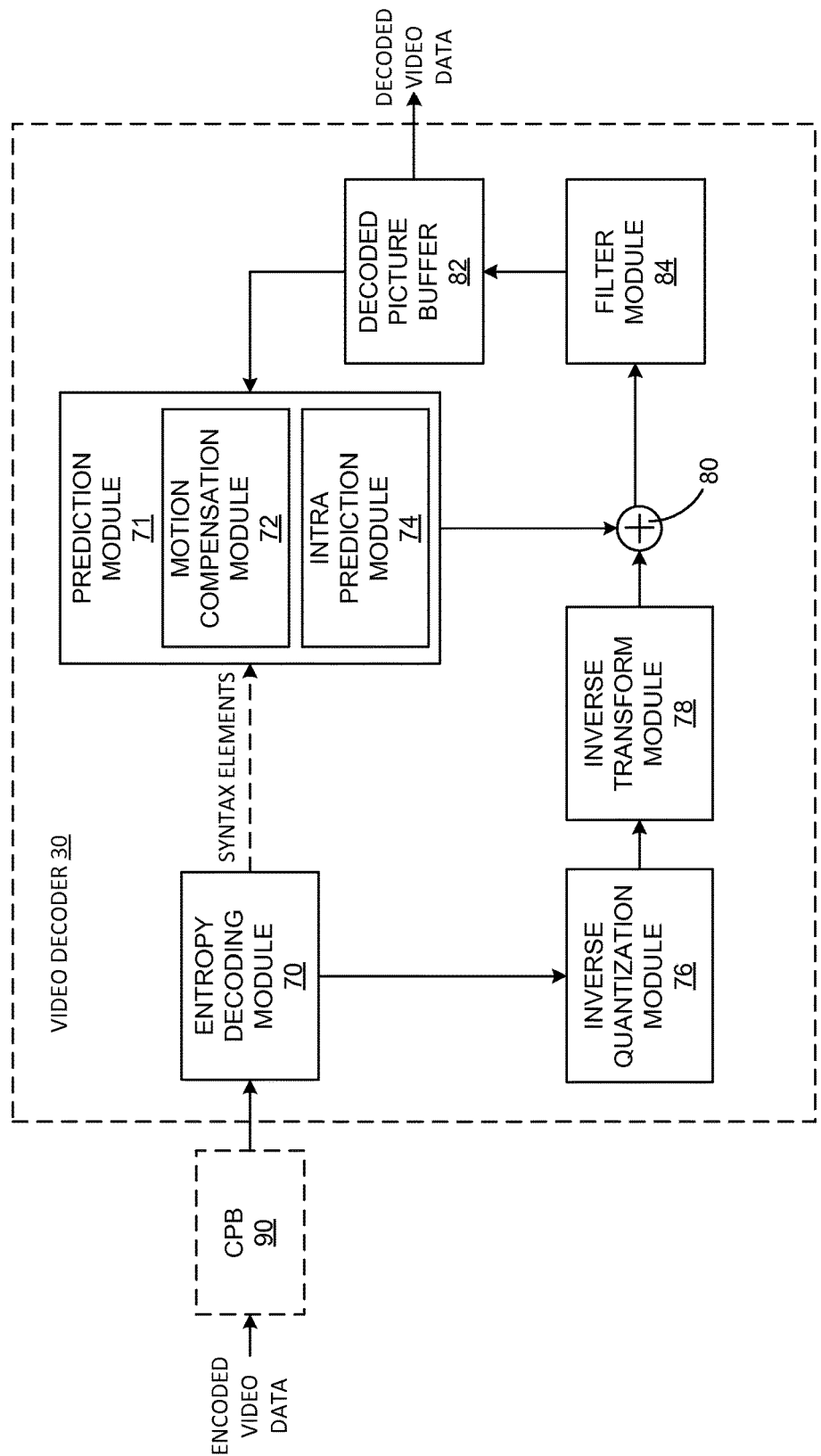
FIG. 3 is a block diagram illustrating the video decoder of FIG. 1.

FIG. 3 is a block diagram illustrating the video decoder of FIG. 1. For purposes of explanation, this disclosure describes video decoder 30 in the context of HEVC coding. However, this disclosure may be applicable to other coding standards or methods.

The video decoder 30 can include an entropy decoding module 70, a prediction module 71, an inverse quantization module 76, an inverse transform module 78, a summer 80, a filter module 84, and a decoded picture buffer (DPB) 82. The prediction module 71 can include a motion compensation module 72 and an intra-prediction module 74. In other examples, the video decoder 30 can include more, fewer, or different functional components.

A coded picture buffer (CPB) 90 may receive and store encoded video data (e.g., NAL units) of a bitstream. The entropy decoding module 70 may receive NAL units from CPB 90 and parse the NAL units to decode syntax elements. The entropy decoding module 70 can entropy decode entropy-encoded syntax elements in the NAL units. The prediction module 71, the inverse quantization module 76, the inverse transform module 78, the summer 80, and the filter module 84 can generate decoded video data based on the syntax elements extracted from the bitstream.

The NAL units of the bitstream may include coded slice NAL units. As part of decoding the bitstream, the entropy decoding module 70 can extract and entropy decode syntax elements from the coded slice NAL units. Each of the coded slices can include a slice header and slice data. The slice header can contain syntax elements pertaining to a slice. The syntax elements in the slice header can include a syntax element that identifies a PPS associated with a picture that contains the slice.

In addition to decoding syntax elements from the bitstream, the video decoder 30 may perform a reconstruction operation on a non-partitioned CU. To perform the reconstruction operation on a non-partitioned CU, the video decoder 30 can perform a reconstruction operation on each TU of the CU. By performing the reconstruction operation for each TU of the CU, the video decoder 30 may reconstruct residual blocks of the CU.

As part of performing a reconstruction operation on a TU of a CU, inverse quantization module 76 can inverse quantize, i.e., de-quantize, coefficient blocks associated with the TU. Inverse quantization module 76 may use a quantization parameter (QP) value associated with the CU of the TU to determine a degree of quantization and, likewise, a degree of inverse quantization for inverse quantization module 76 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization module 76 inverse quantizes a coefficient block, inverse transform module 78 may apply one or more inverse transforms to the coefficient block in order to generate a residual block associated with the TU. For example, inverse transform module 78 may apply an inverse DCT, an inverse integer transform, an inverse directional transform, or another inverse transform to the coefficient block.

If a PU is encoded using intra prediction, intra-prediction module 74 can perform intra-prediction to generate predictive blocks for the PU. Intra-prediction module 74 may use an intra-prediction mode to generate the predictive luma, Cb and Cr blocks for the PU based on the prediction blocks of spatially-neighboring PUs. Intra-prediction module 74 may determine the intra prediction mode for the PU based on one or more syntax elements decoded from the bitstream.

The prediction module 71 can construct a first reference picture list (RefPicList0) and a second reference picture list (RefPicList1) based on syntax elements extracted from the bitstream. Furthermore, if a PU is encoded using inter prediction, entropy decoding module 70 may extract motion information for the PU. The motion compensation module 72 may determine, based on the motion information of the PU, one or more reference regions for the PU. The motion compensation module 72 can generate predictive luma, Cb, and Cr blocks for the PU-based on samples blocks at the one or more reference blocks for the PU.

The summer 80 can use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, the summer 80 can add samples of the luma, Cb and Cr transform blocks to corresponding samples of the predictive luma, Cb and Cr blocks to reconstruct the luma, Cb and Cr coding blocks of the CU. The filter module 84 can be a deblocking filter, for example, and perform a deblocking operation to reduce blocking artifacts associated with the luma, Cb, and Cr coding blocks of the CU. The video decoder 30 can then store the luma, Cb, and Cr coding blocks of the CU in decoded picture buffer 82. The decoded picture buffer 82 can provide reference pictures for subsequent motion compensation, intra prediction, and presentation on a display device, such as display device 32 of FIG. 1. For example, the video decoder 30 can perform intra prediction or inter prediction operations on PUs of other CUs based on the luma, Cb, and Cr blocks in decoded picture buffer 82. Thus, the video decoder 30 can decode, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

Sub-Bitstream Extraction

Video coding standards may include various features to support the sub-bitstream extraction process. For example, video data of the bitstream may be divided into a set of layers. For each of the layers, data in a lower layer may be decoded without reference to data in any higher layer. An individual NAL unit only encapsulates data of a single layer. Thus, NAL units encapsulating data of the highest remaining layer of the bitstream may be removed from the bitstream without affecting the decodability of data in the remaining lower layers of the bitstream. In SVC, SHVC, and other scalable video coding methods, higher layers may include enhancement data that improve the quality of pictures in lower layers (quality scalability), enlarge the spatial format of pictures in lower layers (spatial scalability), or increase the temporal rate of pictures in lower layers (temporal scalability). In MVC, MV-HEVC, and other three-dimensional video coding, higher layers may include additional views.

NAL units can specify a temporal identifier of the NAL unit. If the temporal identifier of a first NAL unit is less than the temporal identifier of a second NAL unit, the data encapsulated by the first NAL unit may be decoded without reference to the data encapsulated by the second NAL unit.

Each operation point of a bitstream is associated with a set of layer identifiers and a temporal identifier. The set of layer identifiers can be denoted as OpLayerIdSet and the temporal identifier may be denoted as TemporalId. If a NAL unit's layer identifier is in an operation point's set of layer identifiers and the NAL unit's temporal identifier is less than or equal to the operation point's temporal identifier, the NAL unit is associated with the operation point. A sub-bitstream is a bitstream subset that is associated with an operation point. The sub-bitstream can include each NAL unit that is associated with the operation point. The sub-bitstream does not include VCL NAL units that are not associated with the operation point.

Hypothetical Reference Decoder

Video coding standards specify video buffering models also referred to as a HRD. The HRD describes how data is to be buffered for decoding and how decoded data is buffered for output. For instance, the HRD describes the operation of a CPB and a DPB of the video coding system 10. The CPB and DPB can comprise the CPB 90 (FIG. 3) and reference picture memory 64 (FIG. 2), respectively. In some embodiments, the DPB can also be similar to the DPB 82 (FIG. 3). The CPB can be first-in first-out buffer containing access units in decoding order specified by HRD. The DPB is a buffer holding decoded pictures for reference, output reordering, or output delay specified by the HRD.

The video encoder 20 can signal a set of sequence-level HRD parameters. The sequence-level HRD parameters control various aspects of the HRD. The sequence-level HRD parameters include an initial CPB removal delay, a CPB size, a bit rate, an initial DPB output delay, and a DPB size. These sequence-level HRD parameters are coded in a hrd_parameters( ) syntax structure specified in a VPS and/or a SPS. The picture-level or sub-picture level HRD parameters can be specified in a BP, PT, or DUI SEI message.

A sub-bitstream (of, e.g., an operation point) can have a different frame rate and/or bit rate than its original bitstream. This can be because the sub-bitstream may not include some pictures and/or some of the data of the original bitstream. Thus, if the video decoder 20 were to remove data from the CPB and/or the DPB at a particular rate when processing the original bitstream and if the video decoder 30 were to remove data from the CPB and/or the DPB at the same rate when processing an sub-bitstream, the video decoder 30 can remove too much or too little data from the CPB and/or the DPB. Accordingly, the video encoder 20 can signal different sets of HRD parameters for different operation points. In HEVC, the video encoder 20 may signal sets of HRD parameters in a VPS or the video encoder 20 may signal sets of HRD parameters in an SPS.

In some versions of HEVC, only the sets of HRD parameters in the VPS are selected for HRD operations. That is, although HRD parameters can be provided in SPSs, the sets of HRD parameters in the SPSs are not selected by HEVC video decoders for HRD operations. The video decoder 30 can parse and decode the VPS of a bitstream. Hence, the video decoder 30 can parse and decode the sets of HRD parameters of the VPS. This can occur irrespective of whether the bitstream includes non-base layer NAL units.

The video encoder 20 can generate a bitstream that includes an SPS that is applicable to a sequence of pictures. In some embodiments, the SPS includes a set of HRD parameters. The set of HRD parameters is applicable to each operation point of the bitstream that has a set of layer identifiers that match a set of target layer identifiers. Thus, the sets of HRD parameters in the SPSs are not wasted, but rather may be used for HRD operations. For instance, a device may select, from among a set of HRD parameters in a VPS and a set of HRD parameters in a SPS, a set of HRD parameters applicable to a particular operation point. The video encoder 20 may perform, based at least in part on the set of HRD parameters applicable to the particular operation point, a bitstream conformance test that tests whether a bitstream subset associated with the particular operation point conforms to a video coding standard.

The video encoder 20, the video decoder 30, or another type of device, such as a content delivery network (CDN) device, a Media-Aware Network Element (MANE), for example, can perform bitstream conformance tests on a sub-bitstream for an operation point. The bitstream conformance tests can verify that the sub-bitstream conforms to a video coding standard, such as HEVC.

In H.264/AVC and HEVC, bitstream conformance and decoder conformance are specified as parts of the HRD specification. The HRD model specifies tests to determine whether a bitstream conforms to a standard and tests to determine whether a decoder conforms to the standard. Though the HRD is referred to as a type of decoder, the video encoder 20 can use the HRD to guarantee bitstream conformance, while the video decoder 30 may not actually require the HRD.

Two types of bitstream subsets are subject to HRD conformance, namely Type I and Type II. A Type I bitstream is a NAL unit stream containing only the VCL NAL units and filler data NAL unit for all access units in the bitstream. A Type II bitstream is a NAL unit stream that contains, in addition to the VCL NAL units and filler data NAL units for all access units in the bitstream, at least one of the following: additional non-VCL NAL units other than filler data NAL units; and all leading_zero_8 bits, zero_byte, start_coded_prefix_one_3 bytes, and trailing_zero_8 bits syntax elements that form a byte stream from the NAL unit stream.

When a device (e.g., the video encoder 20) performs a bitstream conformance test that determines whether a bitstream conforms to a video coding standard, the device can select an operation point of the bitstream. The device can then determine a set of HRD parameters applicable to the selected operation point. The device can use the set of HRD parameters applicable to the selected operation point to configure the behavior of the HRD. More particularly, the device can use the applicable set of HRD parameters to configure the behaviors of particular components of the HRD, such as a hypothetical stream scheduler (HSS), the CPB, a decoding process, the DPB, and so on.

Furthermore, the device may invoke a decoding process that decodes the coded video data in the CPB 90. The decoding process may output decoded pictures to the DPB 82. As the device moves data through the HRD, the device may determine whether a particular set of constraints remain satisfied. For example, the device may determine whether an overflow or underflow condition occurs in the CPB 90 or DPB 82 while the HRD is decoding the sub-bitstream of the selected operation point. The device may select and process each operation point of the bitstream in this manner. If no operation point of the bitstream causes the constraints to be violated, the device may determine that the bitstream conforms to the video coding standard.

Both H.264/AVC and HEVC specify two types of decoder conformance, namely output timing decoder conformance and output order decoder conformance. A decoder (e.g, the video decoder 30) conforming to a specific profile, tier and level (PTL) is able to successfully decode all bitstreams that conform to the bitstream conformance requirements of a video coding standard, such as HEVC. As used herein, a "profile" can generally refer to a subset of the bitstream syntax. "Tiers" and "levels" can be specified within each profile. A level of a tier may be a specified set of constraints imposed on values of the syntax elements in the bitstream. Such constraints may be simple limits on various values. Alternatively, they may take the form of constraints on arithmetic combinations of values (e.g., picture width multiplied by picture height multiplied by number of pictures decoded per second). A level specified for a lower tier is more constrained than a level specified for a higher tier.

The HEVC standard stipulates two sets of bitstream conformance tests based on the content of the video data. The first set of bitstream conformance tests are for testing the conformance of the entire bitstream and its temporal subsets, regardless of whether there is a layer set specified by the active VPS that contains all the nuh_layer_id values of VCL NAL units present in the entire bitstream. The second set of bitstream conformance tests are for testing the conformance of the layer sets specified by the active VPS and their temporal subsets. For all these tests, only the base layer pictures (i.e. pictures with nuh_layer_id equal to 0) are decoded and other pictures are ignored by the decoder when the decoding process is invoked.

Layer Sets Signaled in the Base VPS

In some examples, the video encoder 20 can signal one or more layer sets in the VPS. A VPS, as defined by the HEVC standard, is a syntax structure containing syntax elements that apply to zero or more entire coded video sequences as determined by the content of a video_parameter_set_id syntax element found in the SPS referred to by the seq_parameter_set_id syntax element, which is found in the PPS referred to by the pic_parameter_set_id syntax element found in each slice segment header.

As VPSs apply to entire coded video sequences, the VPS includes syntax elements that change infrequently. The VPS, SPS, and PPS mechanism in some versions of HEVC decouples the transmission of infrequently changing information from the transmission of coded video block data. In HEVC, an identifier (ID) of a VPS, an SPS, or a PPS can be coded for each parameter set. Each SPS includes an SPS ID and a VPS ID, each PPS includes a PPS ID and an SPS ID, and each slice header includes a PPS ID and possibly an APS ID. Accordingly, ID's can be used to identify the proper parameter set to be used in different instances.

A VPS contains two parts, the base VPS and the VPS extension. The base VPS, as defined in the first edition, contains information related to the HEVC version 1 compatible layer, as well as operation points corresponding to layer sets. The base VPS also contains temporal scalability information, including the maximum number of temporal layers. The VPS extension contains information related to the additional layers beyond the base layer.

In MV-HEVC WD8 and SHVC WD6, all layer sets signaled in the base VPS are equivalent to output layer sets (OLSs) for which the only one output layer is the base layer. This is generally referred to herein as "base-layer-output-only OLSs." In general, the $0^{th}$ OLS is one of the base-layer-output-only OLSs, however there can be other OLSs that are also base-layer-output-only OLSs. This is because a video decoder 30 conforming to profiles defined in Annex A of the HEVC specification and their corresponding HRDs decode only the base layer, ignoring the enhancement layers, even though all bits of the enhancement layer are counted in CPB operations when the OLS is decoded.

In some examples, signaling of base-layer-output-only OLSs in the VPS extension is also allowed. However, since this is already accomplished in the base VPS, such signaling in the VPS extension can amount to a waste of bits. Therefore, in some embodiments the HEVC standard can disallow signaling of the base-layer-output-only OLSs in the VPS extension.

Additionally, regardless of whether the entire bitstream corresponds to a layer set signalled in the base VPS, it is also equivalent to a base-layer-output-only OLS. For convenience, an OLS for which there is at least one output layer that is not the base layer is generally referred to herein as a "non-base-layer-output-only OLS."

Profile, Tier, Level

PTL information specifies conformance points for implementing the standard (e.g., HEVC) in an interoperable way across various applications that have similar functional requirements. A profile defines a set of coding tools or algorithms that can be used in generating a conforming bitstream, whereas a level places constraints on certain key parameters of the bitstream, corresponding to decoder processing load and memory capabilities. Level restrictions are established in terms of maximum sample rate, maximum picture size, maximum bit rate, minimum compression ratio and capacities of the DPB, and the coded picture buffer (CPB) that holds compressed data prior to its decoding for data flow management purposes. In the design of HEVC, it was determined that some applications existed that had requirements that differed only in terms of maximum bit rate and CPB capacities.

The profile is the same for all base-layer-output-only OLSs, including the one corresponding to the entire bitstream. This is true even when the base layer is externally provided, in which case the profile is not specified. For example, in such a case, the PTL syntax structure in the base VPS contains only all-zero bits.

When the base layer is in the bitstream, the profile for all the base-layer-output-only OLSs is signalled in the PTL syntax structure of the active SPS for the base layer and in the first PTL syntax structure of the active VPS, that is, the PTL syntax structure in the base part of the active VPS.

The tier and level signaled in the PTL syntax structure of the active SPS for the base layer and in the first PTL syntax structure of the active VPS are for the entire bitstream, which may or may not correspond to a layer set or an OLS signaled in the VPS. However, as noted above, the entire bitstream can correspond to a base-layer-output-only OLS.

In such an example, the base VPS does not contain the tier and level information for other base-layer-output-only OLSs signaled, including the $0^{th}$ OLS that contains only the base layer itself in the layer set. Accordingly, the tier and level of the entire bitstream would also apply to any of the base-layer-output-only OLSs other than the one corresponding to the entire bitstream, though potentially at a sub-optimum rate. This can be because the tier and level information are identified for the entire bitstream. Thus, for a subset of the entire bitstream the tier and profile information can be sub-optimal. For example, the optimal level for a subset of the entire bitstream can be lower than that of the entire bitstream.

Except for the $0^{th}$ OLS, the optimal tier and level information for other base-layer-output-only OLSs can be signaled in the VPS extension, but this is not required. This can be because there is no requirement to have one base-layer-output-only OLS signaled in the VPS extension for each layer set signaled in the base VPS.

From an HEVC version 1 point of view, bitstream conformance tests using their own HRD parameter and only the tier and level information for the entire bitstream is no optimal. This can allow the HRD parameters for all of the operation points other than the one corresponding to the entire bitstream to be sub-optimal while still passing the conformance tests. Thus, certain changes to the conformance tests should be considered. This is described below in connection with FIG. 4.

HRD Parameters in Hrd Parameters( )) Syntax Structures

HEVC specifies video buffering models to handle fluctuations in the bitrate, and variation of the compressed video when transmitting at constant or nearly constant bitrate. Accordingly, the video encoder 20 and the video decoder 30 can buffer the data in the CPB or the DPB, respectively using the HRD. The HRD describes how data is to be buffered for decoding and how decoded data is buffered for output.

The HRD can be used to check bitstream and decoder conformance at various operation points. As noted above, an operation point defines the parameters used for sub-bitstream extraction, which include a list of target layers and a target highest temporal layer. Multiple operation points can be specified for a particular bitstream. Operation points for which the output layers are specified are generally referred to herein as output operation points.

In video coding standards, a compliant bit stream must be decodable by an HRD connected to the output of the video encoder 20 and consists of at least a pre-decoder buffer, a decoder, and an output/display unit (e.g., the display device 32).

A bitstream is compliant if it is decodable by the HRD without buffer overflow or underflow. Buffer overflow occurs when more bits are to be placed into the buffer when it is full. Buffer underflow occurs when some bits are not in the buffer when the bits are to be fetched from the buffer for decoding/playback.

The video encoder 20 can signal a set of HRD parameters to impose constraints to the encoded sizes of pictures and to assist deciding the required buffer sizes and start-up delay.

For a HRD, two types of HRD parameter sets (NAL HRD parameters and VCL HRD parameters) may be used. In some examples, the sequence-level HRD parameter sets are signaled through the hrd_parameters( ) syntax structure, which may be part of the SPS syntax structure or the VPS syntax structure Inside the hrd_parameters( ) syntax structure, only three syntax elements are related to DPB operations. The other elements are for CPB operations only. These three DPB-related syntax elements are:
fixed_pic_rate_general_flag[i],
fixed_pic_rate_within_cvs_flag[i], and
elemental_duration_in_tc_minus1[i], one set for each value of TemporalId.

When pictures are cross-layer aligned, that is, each access unit (AU) has a picture for each layer in the layer set, and fixed picture rate is used, a hrd_parameters( ) syntax structure that applies to a layer set would apply to all OLSs that are associated with the layer set. However, in other situations, a hrd_parameters( ) syntax structure that applies to a layer set may be not applicable to all other OLSs associated with the layer set than the base-layer-output-only OLS.

In other words, it is necessary to enable signaling of the hrd_parameters( ) syntax structures in the VPS extension for OLSs specified in the VPS extension.

Applicability of Non-Nested and Directly Nested BP/PT/DUI SEI Messages

SEI messages can contain information about the timing of the video pictures, the proper interpretation of the color space used in the video signal, 3-D stereoscopic frame packing information, other display hint information, and so on. The BP, PT, and DUI SEI messages contain picture-level and sub-picture-level HRD parameters. Non-nested BP, PT, and DUI SEI messages can apply to the entire bitstream, regardless of whether it corresponds to a layer set or OLS signaled in the VPS.

Directly nested BP, PT, and DUI SEI messages refer to BP, PT, and DUI SEI messages that are directly contained in scalable nesting SEI messages, instead of being indirectly nested. Indirectly nested refers to SEI messages contained in bitstream partition nesting SEI messages that are in turn contained in the scalable nesting SEI messages. A non-nested SEI message is directly included in an SEI NAL unit, instead of being directly or indirectly nested.

According to HEVC version 1, the directly nested BP, PT, and DUI SEI messages apply to the operation points that correspond to the layer sets signaled in the base VPS, which are equivalent to base-layer-output-only OLSs. In some examples, the directly nested BP, PT, and DUI SEI messages do not apply to non-base-layer-output-only OLSs, since there is no way to associate these SEI messages to a non-base-layer-output-only OLS by directly nesting them.

In some examples however, the applicability of non-nested and directly nested BP, PT, and DUI SEI messages are not clear based on the current standard. Accordingly, it is often unclear which of such SEI messages should be selected for use in some bitstream conformance tests.

In some embodiments, it can be beneficial to specify which SEI messages are pertinent to what conformance test. Thus, the directly nested SEI messages can be selected for use with operation points corresponding to base-layer-output-only OLSs. In some embodiments, only the directly nested SEI messages can be selected for use with operation points corresponding to base-layer-output-only OLSs. This can eliminate some ambiguity. In some other embodiments, the SEI messages can be one of BP, PT, and DUI SEI messages.

In some embodiments, the indirectly nested SEI messages can be applied to non-base-layer-output-only OLSs specified in the VPS extension. In some other embodiments, the indirectly nested SEI messages can be one of BP, PT, and DUI SEI messages.

Bitstream Conformance Tests

In some examples, except for the $0^{th}$ OLS, optimal tier and level information for base-layer-output-only OLSs can be signaled in the VPS extension. In HEVC, this may not be required. This is because the video encoder 20 need not signal the base-layer-output-only OLS in the VPS extension for each layer set signaled in the base VPS. In the VPS base, only one set of PTL information is signaled, but multiple hrd_parameters( ) structures can be signaled, for example, one for each base-layer-output-only OLS. Thus, bitstream conformance for the conformance points of a base-layer-output-only OLS are tested against their own HRD parameters. However the constraints are checked against only the tier and level information of the entire bitstream. This is the only PTL information signaled in the VPS base, which is shared by all of the base-layer-output-only OLSs specified by the VPS base. Existing requirements can then allow the HRD parameters for all of the operation points other than the one corresponding to the entire bitstream to be "higher" than the optimal while still passing the conformance tests. In some examples, the tier and level information provides an upper bound to many of the HRD parameters. Therefore the tier or level of the entire bitstream can be higher than the optimal tier or level for a base-layer-output-only OLS. Accordingly, it can be beneficial to implement bitstream conformance tests for different base-layer-output-only OLSs according to their respective content. This can be accomplished by signaling different tier and level information for the different base-layer-output-only OLSs.

In some embodiments, there can be three sets of bitstream conformance tests implemented. The first set of bitstream conformance tests are for testing the conformance of the entire bitstream and its temporal subsets, regardless of whether there is a layer set specified by the active VPS that contains all the nuh_layer_id values of VCL NAL units present in the entire bitstream. The second set of bitstream conformance tests are for testing the conformance of the layer sets specified by the base part of the active VPS (e.g., the VPS base) and their temporal subsets. For all these tests, only the base layer pictures (i.e. pictures with nuh_layer_id equal to 0) are decoded and other pictures are ignored by the decoder when the decoding process is invoked. The third set of bitstream conformance tests can be implemented for testing the conformance of the OLSs specified by the VPS extension of the active VPS and the temporal subsets pf those OLSs.

In some embodiments, the three conformance tests are conducted on one or more output operation points. The output operation points can be selected and extracted from the coded video data that makes up the bitstream. In some embodiments, the selection of the output operation points is based on the content of the parameter sets (e.g., SPS, VPS, PPS) and the content of the bitstream.

In some cases, the selected output operation point can be identified as an output operation point under test (also denoted "Target Op") by selecting a layer identifier list (OpLayerIdList) and a target highest temporal ID (OpTid). The layer identifier list includes all of the layer IDs (nuh_layer_id) of the VCL NAL units present in the bitstream or includes the layer IDs of a layer set specified by the active VPS. In such an example, one of the first or second bitstream conformance tests is applied to the selected output operation point.

As noted above, the third bitstream conformance test is applied to OLSs specified by the VPS extension part of the active VPS and their temporal subsets. For each test in the third set of bitstream conformance tests the output operation point or points can be selected in a slightly different way than the first and second bitstream conformance tests. The selected output operation point (e.g., the output operation point under test, or TargetOp) is selected by identifying a target OLS in the VPS extension and the highest temporal ID (HighestTid) within the OLS.

Figure 4:
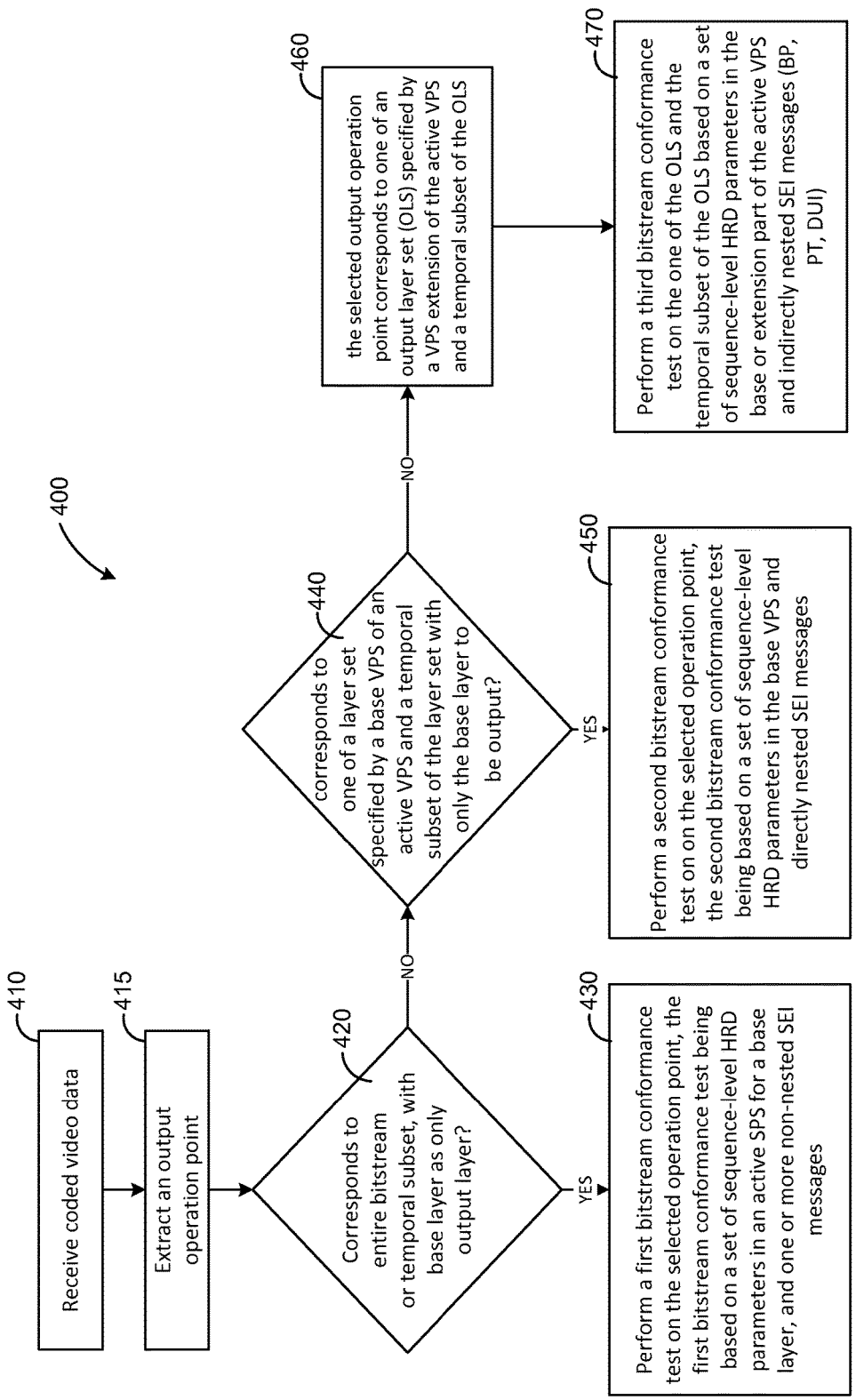
FIG. 4 is a flowchart describing a conformance test implementation method.

FIG. 4 is a flowchart describing a conformance test implementation method. At block 410, the coding system 10 can receive coded video data including a plurality of output operation points. The coded video data can also include an indication of which layers are to be output for each of the output operation points. The indication can be included in a parameter set (e.g., a VPS, SPS). The indication can also be implicit when the output operation point corresponds to an entire bitstream or a temporal subset of the entire bitstream; or a layer set specified by the VPS base or a temporal subset of the layer set. In the implicit cases, only the base layer is to be output. At block 415, the coding system 10 can extract an output operation point to be tested according to a bitstream conformance test. The output operation point can be selected based on the identification of OLSs, temporal subsets of the OLSs, temporal subsets of the entire bitstream, or as otherwise indicated in the VPS base or VPS extension. The one or more processors (processor) comprising the video encoder 20 and the video decoder 30 can then implement a given conformance test for the output operation point (e.g., coded video data) based on its contents.

For example, at decision block 420, if the selected output operation point corresponds to an entire bitstream or a temporal subset of the entire bitstream with only the base layer as the output, the method 400 can move to block 430. At block 430, the processor (e.g., the HRD) can perform a first bitstream conformance test on the selected output operation point based on a set of sequence-level HRD parameters in an active SPS for a base layer and non-nested SEI messages (e.g., BP, PT, and DUI). The set of sequence-level HRD parameters can be specified in an hrd_parameters( ) syntax structure in the active SPS. In some embodiments, the first bitstream conformance test can be further based on a PTL syntax structure in the active SPS.

If the selected output operation point does not correspond to the entire bitstream or a temporal subset of the entire bitstream with only the base layer as the output at decision block 420, the method 400 moves to decision block 440. If at decision block 440, the selected output operation point corresponds to one of a layer set specified by an active VPS base or a temporal subset of the layer set with only the base layer to be output, the processor can perform a second bitstream conformance test at block 450. The second bitstream conformance test can be performed on the selected output operation point based on a set of sequence-level HRD parameters in the base VPS and directly nested BP, PT, or DUI SEI messages. The set of sequence-level HRD parameters can be specified in an hrd_parameters( ) syntax structure in the active VPS base.

If at decision block 440, the coded video data does not correspond to one of a layer set specified by a base part of an active VPS or a temporal subset of the layer set with only the base layer to be output, the coded video data corresponds to one of an OLS specified by a VPS extension of an active VPS or a temporal subset of the OLS, as shown in block 460. At block 470, the processor (e.g., the HRD) can perform a third bitstream conformance test on the selected output operation point based on a set of sequence-level HRD parameters in the base or extension part of the active VPS and indirectly nested BP, PT, or DUI SEI messages. The set of sequence-level HRD parameters can be specified in an hrd_parameters( ) syntax structure in the base or extension part of the active VPS. Accordingly, with the three separate types of conformance tests, bitstream conformance tests for different types of output operation points are clearly and efficiently specified and in a way that is backward compatible to the specification of HEVC version 1.

In some embodiments, for the base-layer-output-only OLSs among all OLSs specified in the VPS extension, if any, the applicable hrd_parameters( ) syntax structure in the base part of the active VPS, and the applicable, directly nested BP, PT, and DUI SEI messages are used. The existing syntax and process allow this in a way that is backward compatible to HEVC version 1, however this is not allowed for other OLSs specified in the VPS extension.

It should be noted that if a non-base-layer-output-only OLS contains all layers in the entire bitstream, still only indirectly nested BP, PT, and DUI SEI messages may be used, not the non-nested ones, as the non-nested ones are for the base-layer-output-only OLS containing all layers in the entire bitstream.

The use of the PTL syntax structure is the same for both base-layer-output-only OLSs and non-base-layer-output-only OLSs among all OLSs specified in the VPS extension. The most appropriately applicable PTL syntax structure, either in the base VPS or in the VPS extension, is used.

Note that if a non-base-layer-output-only OLS contains all layers in the entire bitstream, still only a PTL syntax structure in the VPS may be used, not the one in the PTL syntax structure in the SPS active for the base layer, as that one is for the base-layer-output-only OLS containing all layers in the entire bitstream.

Information and signals disclosed herein can be represented using any of a variety of different technologies and methods. For example, data, instructions, commands, information, signals, bits, symbols, and chips that can be referenced throughout the above description can be represented by voltages, currents, electromagnetic waves, magnetic fields or particles, optical fields or particles, or any combination thereof.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The embodiments described herein may be implemented in hardware, software, firmware, or any combination thereof. Such embodiments may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the methods may be realized at least in part by a computer-readable data storage medium comprising program code including instructions that, when executed, performs one or more of the methods described above. The computer-readable data storage medium may form part of a computer program product, which can include packaging materials. The computer-readable medium can comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The methods additionally, or alternatively, can be realized at least in part by a computer-readable communication medium that carries or communicates program code in the form of instructions or data structures and that can be accessed, read, and/or executed by a computer, such as propagated signals or waves.

The program code can be executed by a processor, which can include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor can be configured to perform any of the methods and processes described in this disclosure. A general purpose processor can be a microprocessor; but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein can refer to any of the foregoing structure, any combination of the foregoing structure, or any other structure or apparatus suitable for implementation of the methods described herein. In addition, in some aspects, the functionality described herein can be provided within dedicated software modules or hardware modules configured for encoding and decoding, or incorporated in a combined video encoder-decoder (CODEC).

Although embodiments of the disclosure are described above for particular embodiment, many variations of the disclosure are possible. For example, the numbers of various components can be increased or decreased, modules and steps that determine a supply voltage can be modified to determine a frequency, another system parameter, or a combination of parameters. Additionally, features of the various embodiments can be combined in combinations that differ from those described above.

Those of skill will appreciate that the various illustrative blocks and modules described in connection with the embodiment disclosed herein can be implemented in various forms. Some blocks and modules have been described above generally in terms of their functionality. How such functionality is implemented depends upon the design constraints imposed on an overall system. Skilled persons can implement the described functionality in varying ways for each particular application, but such implementation decisions should not be interpreted as causing a departure from the scope of the disclosure. In addition, the grouping of functions within a module, block, or step is for ease of description. Specific functions or steps can be moved from one module or block or distributed across to modules or blocks without departing from the disclosure.

The above description of the disclosed embodiment is provided to enable any person skilled in the art to make or use the subject matter of the disclosure. Various modifications to these embodiments will be readily apparent to those skilled in the art, and the generic principles described herein can be applied to other embodiment without departing from the spirit or scope of the disclosure. Thus, it is to be understood that the description and drawings presented herein represent a presently preferred implementation of the disclosure and are therefore representative of the subject matter which is broadly contemplated by the present disclosure. It is further understood that the scope of the present disclosure fully encompasses other embodiment that may become obvious to those skilled in the art and that the scope of the present disclosure is accordingly limited by nothing other than the appended claims.

What is claimed is:

1. A method of processing video data comprising:
receiving coded video data having a plurality of output operation points;
extracting a selected output operation point from the plurality of output operation points, the selected output operation point being a sub-bitstream of an entire bitstream;
performing a first bitstream conformance test on the selected output operation point when the selected output operation point corresponds to one of an entire bitstream with only the base layer to be output, and a temporal subset of the entire bitstream with only the base layer to be output, the first bitstream conformance test being based on a set of sequence-level hypothetical reference decoder (HRD) parameters in an active sequence parameter set (SPS) for a base layer, and one or more non-nested supplemental enhancement information (SEI) messages, wherein the non-nested SEI messages comprise one of decoding unit information (DUI), buffering period (BP), and picture timing (PT) SEI messages, and the non-nested SEI messages are directly included in an SEI network abstraction layer (NAL) unit,
performing a second bitstream conformance test on the selected output operation point when the selected output operation point corresponds to one of a layer set specified by a base video parameter set (VPS) of an active VPS and a temporal subset of the layer set with only the base layer to be output, the second bitstream conformance test being based on a set of sequence-level HRD parameters in the base VPS and directly nested SEI messages, and performing a third bitstream conformance test on the selected output operation point when the selected output operation point corresponds to one of an output layer set (OLS) specified by a VPS extension of the active VPS and a temporal subset of the OLS, the third bitstream conformance test being based on a set of sequence-level HRD parameters in the active VPS and indirectly nested SEI messages; and applying the indirectly nested SEI messages only when the selected output operation point corresponds to an OLS specified in the VPS extension, the indirectly nested SEI messages being one of BP, PT, and DUI SEI messages.

2. The method of claim 1 further comprising applying directly nested SEI messages only when the selected output operation point corresponds to an OLS identified in the base part of the active VPS, the directly nested SEI messages being one of buffer period (BP), picture timing (PT), and decoder unit information (DUI) SEI messages.

3. The method of claim 1, further comprising including the set of sequence-level HRD parameters in an hrd_parameters( ) syntax structure in one of the SPS, the base VPS, and the VPS extension.

4. The method of claim 1, wherein the directly-nested SEI messages are directly included in scalable nesting SEI messages.

5. The method of claim 1, wherein the indirectly-nested SEI messages are contained in bitstream partition nesting SEI messages, the bitstream partition nesting SEI message being contained in a scalable nesting SEI message.

6. The method of claim 1 further comprising performing the third bitstream conformance test on the selected output operation point, the third bitstream conformance test further being based on the set of sequence-level HRD parameters in the active VPS and indirectly nested SEI messages being located in one of the base VPS and the VPS extension.

7. The method of claim 1, further comprising selecting the selected output operation point from the plurality of output operation points of the coded video data.

8. A device for processing video data comprising:
a memory configured to store coded video data, the coded video data having a plurality of output operation points; and
a processor operably coupled to the memory and configured to:
extract a selected output operation point from the plurality of output operation points, the selected output operation point being a sub-bitstream of an entire bitstream;
perform a first bitstream conformance test on the selected output operation point when the selected output operation point corresponds to one of an entire bitstream with only the base layer to be output, and a temporal subset of the entire bitstream with only the base layer to be output, the first bitstream conformance test being based on a set of sequence-level hypothetical reference decoder (HRD) parameters in an active sequence parameter set (SPS) for a base layer, and one or more non-nested supplemental enhancement information (SEI) messages, wherein the non-nested SEI messages comprise one of decoding unit information (DUI), buffering period (BP), and picture timing (PT) SEI messages, and the non-nested SEI messages are directly included in an SEI network abstraction layer (NAL) unit, perform a second bitstream conformance test on the selected output operation point when the selected output operation point corresponds to one of a layer set specified by a base video parameter set (VPS) of an active VPS and a temporal subset of the layer set with only the base layer to be output, the second bitstream conformance test being based on a set of sequence-level HRD parameters in the base VPS and directly nested SEI messages, and perform a third bitstream conformance test on the selected output operation point when the selected output operation point corresponds to one of an output layer set (OLS) specified by a VPS extension of the active VPS and a temporal subset of the OLS, the third bitstream conformance test being based on a set of sequence-level HRD parameters in the active VPS and indirectly nested SEI messages; and apply indirectly nested SEI messages only when the selected output operation point corresponds to an OLS specified in the VPS extension, the indirectly nested SEI messages being one of BP, PT, and DUI SEI messages.

9. The device of claim 8, wherein the processor is further configured to apply directly nested SEI messages only when the selected output operation point corresponds to an OLS identified in the base part of the active VPS, the directly nested SEI messages being one of buffer period (BP), picture timing (PT), and decoder unit information (DUI) SEI messages.

10. The device of claim 8, wherein the set of sequence-level HRD parameters are included in an hrd_parameters( ) syntax structure in one of the SPS, the base VPS, and the VPS extension.

11. The device of claim 8, wherein the directly-nested SEI messages are directly included in scalable nesting SEI messages.

12. The device of claim 8, wherein the indirectly-nested SEI messages are contained in bitstream partition nesting SEI message, the bitstream partition nesting SEI message being contained in a scalable nesting SEI message.

13. The device of claim 8, wherein the processor is further configured to perform the third bitstream conformance test on the selected output operation point, the third bitstream conformance test further being based on the set of sequence-level HRD parameters in the active VPS and indirectly nested SEI messages being located in one of the base VPS and the VPS extension.

14. The device of claim 8, wherein the processor is further configured to select the selected output operation point from the plurality of output operation points of the coded video data.

15. An apparatus for processing video data comprising:
a memory means for storing coded video data, the video data having a plurality of output operation points; and
a decoder means operably coupled to the memory means for:
extracting a selected output operation point from the plurality of output operation points, the selected output operation point being a sub-bitstream of an entire bitstream;
performing a first bitstream conformance test on the selected output operation point when the selected output operation point corresponds to one of an entire bitstream with only the base layer to be output, and a temporal subset of the entire bitstream with only the base layer to be output, the first bitstream conformance test being based on a set of sequence-level hypothetical reference decoder (HRD) parameters in an active sequence parameter set (SPS) for a base layer, and one or more non-nested supplemental enhancement information (SEI) messages, wherein the non-nested SEI messages comprise one of DUI, BP, and PT SEI messages, and the non-nested SEI messages are directly included in an SEI network abstraction layer (NAL) unit, performing a second bitstream conformance test on the selected output operation point when the selected output operation point corresponds to one of a layer set specified by a base video parameter set (VPS) of an active VPS and a temporal subset of the layer set with only the base layer to be output, the second bitstream conformance test being based on a set of sequence-level HRD parameters in the base VPS and directly nested SEI messages, performing a third bitstream conformance test on the selected output operation point when the selected output operation point corresponds to one of an output layer set (OLS) specified by a VPS extension of the active VPS and a temporal subset of the OLS, the third bitstream conformance test being based on a set of sequence-level HRD parameters in the active VPS and indirectly nested SEI messages; and applying indirectly nested SEI messages only when the selected output operation point corresponds to an OLS identified in the VPS extension of the active VPS, the indirectly nested SEI messages being one of BP, PT, and DUI SEI messages.

16. The apparatus of 21, wherein the decoder means is a hypothetical reference decoder implemented by at least one processor.

17. The apparatus of 21, wherein the decoder means is configured to apply directly nested SEI messages only when the selected output operation point corresponds to an OLS identified in the VPS base of the active VPS, the directly nested SEI messages being one of buffer period (BP), picture timing (PT), and decoder unit information (DUI) SEI messages.

18. A non-transitory computer-readable medium containing instructions that when executed by a processor cause a computer to:

receive coded video data having a plurality of output operation points;

extract a selected output operation point from the plurality of output operation points, the selected output operation point being a sub-bitstream of an entire bitstream;

perform a first bitstream conformance test on the selected output operation point when the selected output operation point corresponds to one of an entire bitstream with only the base layer to be output, and a temporal subset of the entire bitstream with only the base layer to be output, the first bitstream conformance test being based on a set of sequence-level hypothetical reference decoder (HRD) parameters in an active sequence parameter set (SPS) for a base layer, and one or more non-nested supplemental enhancement information (SEI) messages, wherein the non-nested SEI messages comprise one of DUI, BP, and PT SEI messages, and the non-nested SEI messages are directly included in an SEI network abstraction layer (NAL) unit, perform a second bitstream conformance test on the selected output operation point when the selected output operation point corresponds to one of a layer set specified by a base video parameter set (VPS) of an active VPS and a temporal subset of the layer set with only the base layer to be output, the second bitstream conformance test being based on a set of sequence-level HRD parameters in the base VPS and directly nested SEI messages, and perform a third bitstream conformance test on the selected output operation point when the selected output operation point corresponds to one of an output layer set (OLS) specified by a VPS extension of the active VPS and a temporal subset of the OLS, the third bitstream conformance test being based on a set of sequence-level HRD parameters in the active VPS and indirectly nested SEI messages; and apply indirectly nested SEI messages only when the selected output operation point corresponds to an OLS specified in the VPS extension, the indirectly nested SE messages being one of BP, PT, and DUI SEI messages.

19. The non-transitory computer-readable medium of claim 18, wherein the instructions further cause the computer to apply directly nested SEI messages only when the selected output operation point corresponds to an OLS identified in the base part of the active VPS, the directly nested SEI messages being one of buffer period (BP), picture timing (PT), and decoder unit information (DUI) SEI messages.

20. The non-transitory computer-readable medium of claim 18, the set of sequence-level HRD parameters are included in an hrd_parameters( ) syntax structure in one of the SPS, the base VPS, and the VPS extension.

21. The non-transitory computer-readable medium of claim 18, wherein the indirectly-nested SEI messages are contained in buffering period (BP) nesting SEI message, the BP nesting SEI message being contained in a scalable nesting SEI message.

22. The non-transitory computer-readable medium of claim 18, wherein one or more non-base-layer-output-only OLSs are subjected to the third conformance test, the third conformance test further being based on an hrd_parameters ( ) syntax structure in one of the base VPS and the VPS extension.

23. The method of claim 1, the method being executable on a wireless communication device, wherein the device comprises:

a memory configured to store the video data;

a processor configured to execute instructions to process the video data stored in said memory; and an input interface, including a receiver, configured and arranged to receive the coded video data having the plurality of output operation points.

24. The method of claim 23, wherein the wireless communication device is a cellular telephone and the video data is received by the receiver and modulated according to a cellular communication standard.

25. The device of claim 8, wherein the device is a wireless communication device, further comprising:

an input interface, including a receiver, configured and arranged to receive the coded video data having the plurality of output operation points.

26. The device of claim 25, wherein the wireless communication device is a cellular telephone and the video data is received by the receiver and modulated according to a cellular communication standard.

* * * * *